United States Patent [19]

Sandner et al.

[11] 4,088,615
[45] May 9, 1978

[54] METHOD OF IMPROVING THE DIECUTTABILITY OF POLYESTER URETHANE FOAM AND THE IMPROVED DIECUTTABLE POLYESTER URETHANE FOAMS THEMSELVES

[75] Inventors: Michael Ray Sandner, Chappaqua, N.Y.; Walter Richard Rosemund, Englewood, N.J.; Ronald David Carey, Peekskill, N.Y.

[73] Assignee: Union Carbide Corporation, New York, N.Y.

[21] Appl. No.: 645,401

[22] Filed: Dec. 30, 1975

[51] Int. Cl.$^2$ .................. C08G 18/14; C08G 18/28
[52] U.S. Cl. ...................... 260/2.5 AM; 252/182; 260/2.5 AG; 260/2.5 AH; 260/2.5 AN; 260/2.5 AP; 260/2.5 AQ; 260/75 NP; 260/75 NQ; 260/77.5 AM
[58] Field of Search .............. 252/182; 260/2.5 AG, 260/2.5 AH, 2.5 AM, 2.5 AN, 2.5 AP, 2.5 AQ, 75 NP, 75 NQ, 77.5 AM

[56] References Cited

U.S. PATENT DOCUMENTS

| | | | |
|---|---|---|---|
| 2,894,919 | 7/1959 | Simon et al. | 260/77.5 AC |
| 3,507,815 | 4/1970 | Bailey et al. | 252/182 |
| 3,594,334 | 7/1971 | Marlin et al. | 260/2.5 |
| 3,676,376 | 7/1972 | Svoboda et al. | 260/2.5 AN |
| 3,810,841 | 5/1974 | Richter | 260/2.5 AG |
| 3,867,420 | 2/1975 | Morehouse et al. | 260/2.5 AM |

OTHER PUBLICATIONS

Saunders et al.–Polyurethanes Chemistry & Technology (Part II) (Interscience) (N.Y.) (1964), pp. 212–213.
Phillips et al.–Polyurethanes (Illiffe Books, Ltd.) (London) (1964), pp. 91–92.
McCutcheon–Detergents & Emulsifiers, 1972 Annual (Allured Pub. Corp.) (Ridgewood, N.J.), p. 6.

Primary Examiner—Donald E. Czaja
Assistant Examiner—H. H. Fletcher
Attorney, Agent, or Firm—Dale Lynn Carlson

[57] ABSTRACT

Improved diecuttable polyester urethane foams are provided by the inclusion in the foam formulation of specified minor amounts of certain low molecular weight polyols, typically having hydroxyl numbers of 100 or greater. Representative useful species of such polyols include aliphatic alcohols, such as glycerol and erythritol, polymethylols such as trimethylolpropane, alkanolamines such as triethanolamine and relatively low molecular weight alkylene oxide adducts such as propylene - glycerol adducts and the like. Especially effective diecuttable foam formulations are provided by further employing, as co-additives, certain alkylene oxide adducts of linear alcohols or phenols, sulfonated petroleum oils, ammonium salts and silicone-containing copolymers. If desired, the viscosity and compatibility characteristics of the additive and/or additive and co-additive mixture may be modified by the incorporation of a diluent.

39 Claims, No Drawings

METHOD OF IMPROVING THE DIECUTTABILITY OF POLYESTER URETHANE FOAM AND THE IMPROVED DIECUTTABLE POLYESTER URETHANE FOAMS THEMSELVES

BACKGROUND OF THE INVENTION

The present invention relates to diecuttable polyester urethane foams and, more particularly, to improvements in the diecuttability of such foams.

Polyester foams manufactured for use in applications requiring good diecuttability, i.e., - the ability to be diecut or stamped to various shapes, have a history of variable diecuttability performance. Day-to-day variations in performance have consistently plagued the processing of this type of foam.

Typical problems include too slow recovery to the original height of the foam and permanent edge curl or deformation of the resulting diecut foam. Perhaps the most severe problem is caused when the edges of the diecut foam have become sealed or welded. These problems are particularly acute with lower density foams.

The magnitude of the general problem of providing satisfactorily diecuttable foams has engendered a multitude of theories as to the causes of good (or poor) diecuttability as well as techniques for improving diecuttability. Thus, to achieve improved diecuttability, it has been proposed that: lubrication of the urethane is required, the foams must be fairly open, course celled foam is better than fine celled foam, and raising the tolylene diisocyanate index aids as well as other suggestions. Many manufacturers of polyester foam for diecuttable applications employ relatively high molecular weight amine compounds as additives in an attempt to improve diecuttability. Typical of such additives include N-coco morpholine (morpholinated coconut oil) and N-lauryl morpholine.

Despite these many suggested techniques and theories, the provision of consistently satisfactory polyester foams for diecutting applications remains a problem.

While an ostensibly ready solution would be the utilization of polyether foams, which typically provide adequate diecuttability, this is now wholly satisfactory. Many and diverse specialty applications (e.g. - hair curlers and the like) require aesthetic foam characteristics not generally available when polyether foam formulations are used. A modification in the foam formulation such as, for example, the particular isocyanate used, may provide some improvement; but this is generally unacceptable due to the associated inventory problems.

The inclusion of low combustibility additives into foam formulations for diecutting applications has further heightened the problem. The overall result is that it is estimated that somewhere in the range of about 10 to 30 percent of the polyester foam used for commercial diecutting applications must be rejected due to unsatisfactory diecuttability. The accompanying economic penalty is apparent.

It is thus an object of the present invention to provide a method of obtaining polyester urethane foams characterized by consistently improved diecuttability. A related object provides polyester urethane foams possessing improved diecuttability properties even when low combustibility additives are employed in the foam formulations.

A still further and specific object of this invention is to provide polyester urethane foams having improved diecuttability characteristics without causing any concomitant significant adverse affects on the foam characteristics.

Yet another object provides an additive formulation for diecuttable polyester foams with suitable viscosity and compatibility to allow easy handling with conventional formulations.

Another object is to provide relatively low density polyester urethane foams with improved diecuttability properties.

Other objects and advantages of the present invention will become apparent from the following detailed description.

While the invention is susceptible to various modifications and alternative forms, there will herein be described in detail the preferred embodiments. It is to be understood, however, that it is not intended to limit the invention to specific forms disclosed. On the contrary, it is intended to cover all modifications and alternative forms falling within the spirit and scope of the invention as expressed in the appended claims. Thus, while the advantageous results of the present invention are exemplified herein in connection with certain polyester foam formulations, it should be appreciated that the present invention is equally applicable to use in connection with any polyester foams possessing diecuttable properties.

SUMMARY OF THE INVENTION

In general, the present invention is predicated on the discovery that the inclusion of certain low molecular weight polyols, typically having hydroxyl numbers in excess of 100, as additives in specified amounts, consistently provide an improvement in the diecuttability characteristics of polyester urethane foam when employed as a component in typical diecuttable polyester urethane foam formulations. In accordance with a further aspect of the present invention, it has been found that certain co-additives may be used with the specified polyhydroxyl compounds to enhance and aid in the initial recovery after diecutting of polyester urethane foams. A concomitant advantage of using such optional co-additives is a reduction in the amount of the isocyanate constituent which must be added in the foam formulation to achieve the requisite diecuttability.

DETAILED DESCRIPTION OF THE INVENTION AND PREFERRED EMBODIMENTS

In accordance with the present invention, the low molecular weight polyols which have been found to be useful for improving the diecuttability of polyester polyurethane foams fall, in general, into four categories. The first category comprises aliphatic alcohols having the following structural formula:

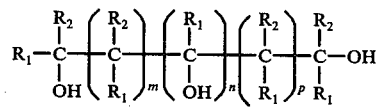

where $R_1$ may be hydrogen, alkyl ($C_1$–$C_8$), cycloalkyl ($C_4$–$C_8$); $R_2$ may be hydrogen or alkyl ($C_1$–$C_4$); $m$ and $p$ are integer values, $m$ and $p$ may equal zero and the sum of $m$ and $p$ is 8 or less; and $n$ may assume integer values from 1 to about 4 ($n=0$). Preferred species within this type include glycerol and erythritol. Further illustrative species include sorbitol; 1, 2, 6-hexanetriol; 1, 3, 5-hexanetriol and 1, 2, 4-butanetriol.

The second type of suitable additives comprise low molecular weight polymethylol compounds having the following structural formula:

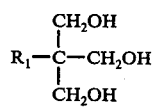

wherein $R_1$ may be hydrogen, lower alkyl ($C_1$ to about $C_8$) or methylol ($CH_2OH$). Representative species include trimethylolpropane, pentaerythritol and trimethylolethane. Trimethylolpropane is particularly preferred.

The third category consists of alkanolamines having the following structural formula:

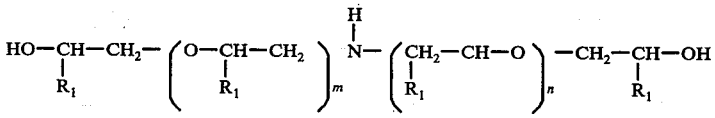

wherein $R_1$ may be H or alkyl ($C_1$ to about $C_4$) and $m$ and $n$ are zero or may have integral values from one to about four. Illustrative species within this category include diethanolamine, diisopropanolamine and ethanol isopropanol amine, diethanolamine being preferred.

The last category comprises alkylene oxide adducts of polyhydroxyalkanes or sucrose. More specifically, this category includes alkylene oxide adducts having a functionality greater than 2 and a minimum hydroxyl number of about 100, the hydroxyl number preferably being 200 or more. The alkylene oxides may comprise ethylene oxide, propylene oxide, butylene oxide, or mixtures thereof. Polypropylene oxide is preferred; and, when mixtures are employed, the polypropylene oxide content is desirably 70 percent by weight or greater. Illustrative starters include glycerol; erythritol; sorbitol; 1, 2, 6-hexanetriol; 1, 3, 5-hexanetriol; 1, 2, 4-butanetriol; sucrose; diethylenetriamine; mannitol; 1, 1, 1-trimethylolpropane; pentaerythritol; novolac resins and 1, 1, 1-trimethylolethane. Suitable species include the following: a propylene oxideglycerol adduct having a hydroxyl number of about 237.5, a propylene oxide-sucrose adduct having a hydroxyl number of about 490 and a propylene oxide-diethylenetriamine adduct having a hydroxyl number of about 700. Still further examples include a propylene oxide-glycerol adduct having a hydroxyl number of about 112.5 and a propylene oxide-1, 2, 6-hexanetriol adduct having a hydroxyl number in the range of from about 200 to 700.

Considering all the categories, it is preferred to utilize glycerol as the diecuttability-enhancing additive due to its effectiveness and efficiency in use. For example, as may be apparent, the use of the alkylene oxide adducts will require greater amounts than employed with the lower molecular weight polyols such as glycerol.

Conceptually, the additive should be present in an amount sufficient to impart improved diecuttability characteristics to the polyester urethane foam but inadequate to adversely affect, to any significant extent, the foam characteristics required for the particular end use involved. The minor amounts required should also be contrasted to the inclusion of such additives in gross amounts that could be considered as changing the character of the foam from a polyester to a polyether or hybrid-type. Also, and, in general, increasing amounts should be utilized as the hydroxyl number of the polyol additive decreases. It has generally been found suitable to employ such principal additives in a range of, per 100 parts by weight of the polyester polyol used in the foam formulation, 0.05 to about 10 parts, preferably 0.1 to about 6.0 parts and, more preferably, from about 0.2 to about 3.0. The requisite amount can be provided by using a single principal additive or, if desired, a mixture of the diecuttability-enhancing additives may suitably be employed.

In accordance with a further aspect of the present invention, certain co-additives may be employed in combination with the aforementioned low molecular weight polyhydroxyl compounds to provide the requisite improved diecuttability. The utilization of such co-additives allows a reduction in the amount of the polyhydroxyl compound required to achieve given diecuttability characteristics, which in turn allows a decrease in the amount of the isocyanate which must be added to compensate for the additional urethane equivalent of the polyhydroxyl compound additive. These co-additives have not been found to impart sufficient improved diecuttability when used alone but do enhance and aid in providing improved diecuttability properties when employed together with the hereinbefore described polyhydroxyl principal additives.

Several classes of materials may suitably be utilized as co-additives and exhibit a synergistic effect when employed with appropriate amounts of the principal additives. More particularly, the use of an additive and co-additive mixture has, in general, been found to provide diecuttability characteristics greater than the effect provided by utilizing comparable amounts of either the principal or co-additive alone. The first class of co-additives comprise alkylene oxide adducts of linear (about $C_4$ to $C_{15}$) alcohols and phenols. The moles of the alkylene oxide used to form the adduct, per mole of the linear alcohol or phenol, may vary from about 3 to about 15, preferably 5 to 12. More particularly, suitable materials include ethylene oxide addition products to alcohols such as nonylphenol and trisdecanol or other linear alcohols (often present as mixtures). Representative examples within this class include ethylene oxide-nonylphenol addition products wherein the approximate moles of the oxide are 9 and 10.5 and ethylene oxide-linear alcohol ($C_{11}$-$C_{15}$) products wherein the approximate moles of the oxide are 7 and 9, the last specie (e.g. about 9 moles of the linear alcohol per mole of oxide) being particularly preferred.

Further suitable materials useful as co-additives comprise sulfonated petroluem oils and ammonium salts. The sulfonated petroleum oils may be formed by the sulfonation of a hydrocarbon fraction and will typically consist of mixtures of various hydrocarbons. Useful materials are commercially available and may functionally be characterized as surface-active agents. While the term "sulfonated" has been used, such materials are typically made, as is known, by sulfating the hydrocarbon fraction used by treatment at low temperatures with strong sulfuric acid, with subsequent washing and neutralization of the sulfated mass. More particularly, these liquid, anionic organic surfactants contain at least one carbon-bonded sulfonic acid group, —$SO_3H$, or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 20 or more carbon atoms such as alkanes, high alkyl-substituted benzenes, and liquid petroleum fractions, as typically illustrated by sodium tetradecyl sulfonate and sodium dodecylbenzene mineral oil. Suitable materials are commercially available and include sodium sulfonates of a hydrocarbon mixture, "Petronate L" and "Alconate 80" (Witco Chemical Company). While only diethylammonium oleate has been employed, other dialkyl ammonium salts of fatty acid should likewise be useful.

A further class of suitable co-additives comprise silicone copolymers including cyanopropyl-substituted, silicone-containing copolymers. Polymethylsiloxane-polyoxyethylene copolymers having the average composition:

$$[M]_2 [X]_x [Y]_y [Z]_z$$

wherein the subscripts $x$, $y$ and $z$ designate the average number of moles of the respective difunctional units contained in the polymer for every 2 moles of M, as shown, are useful. In these polymers, $x$ can be zero or any positive number having an average value up to about 20, $y$ has an average value from about 2 to about 20 and $z$ has an average value from about 2 to about 30, provided the average weight of the polymers attributable to said polyoxyalkylene blocks (E) is from about 50 to about 85 weight percent. The M, X, Y and Z units have the following formulae:

M is $(R)_3SiO_{1/2}$

X is $(R)_2SiO_{2/2}$

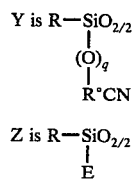

wherein: R is alkyl; $q$ is zero or one; R° is bivalent alkylene; and E is the aformentioned polyoxyalkylene block. Other useful copolymers are described in U.S. Pat. No. 3,594,334.

A simple co-additive or a mixture may be used with the principal polyhydroxyl compound or compounds being employed. The relative amount of the co-additive or additives used should be coordinated with the amount of the principal additive to allow achievement of the objectives of the present invention, viz. - the improved diecuttability of the resulting polyester foam. Typically, useful levels for the mixture of the co-additive with the principal additive will be within the ranges hereinbefore set forth for the principal additive.

As is known, the classes of materials identified as being useful co-additives have to some extent been previously incorporated into urethane foam formulations for purposes such as foam stabilization and the like. The levels used have been varied to provide the desired foam properties. There has, however, been no appreciation that the level of such co-additives could be adjusted in conjunction with the principal additives of the present invention to impart consistently improved diecuttability characteristics. Without the inclusion of a principal diecuttability enhancing additive, an adjustment of the levels of co-additives, within the constraint of providing the required physical properties of the foam, will not achieve consistent improvement in the diecuttability characteristics.

While not essential, it may be desirable in certain situations to adjust the viscosity and compatibility of the particular additive or additive mixture being employed to facilitate processing with the polyester polyol foam formulation being employed. For this purpose, the additives may be employed with suitable diluents to yield a blend having the desired stability, solubility and performance level. As should be apparent, any diluent yielding the desired blend characteristics may be utilized so long as the necessary foam characteristics are not adversely affected in any significant extent.

The reactants used to form the polyester urethane foams with which the additives of the present invention are employed may be varied as desired. Typically, in addition to the diecuttability enhancing additives, the foams are prepared by reacting and foaming a reaction mixture of: (a) a polyester polyol reactant containing an average of at least two hydroxyl groups per molecule; (b) a polyisocyanate reactant containing at least two isocyanato groups per molecule; (c) a blowing agent; (d) a catalyst for the reaction of (a) and (b); and (e) a foam stabilizer. As is known, not all polyester foams are suitably diecuttable; and utilization of the additives of the present invention will not necessarily provide sufficient improvement to allow usage in diecutting applications. However, utilizing the additives of the present invention will consistently provide improved diecuttability for the products resulting from polyester foam formulations typically used for diecutting applications.

The polyester polyols employed are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters have hydroxyl numbers from 30 to 150, and preferably have hydroxyl numbers from 45 to 65. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and funcationality of the polyol:

$$OH = \frac{56.1 \times 100 \times f}{M.W.}$$

wherein OH = hydroxyl number of the polyol,
$f$ = average functionality, that is, the average number of hydroxyl groups per molecule of polyol, and
M. W. = average molecular weight of the polyol.

Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example, glycerol; 1, 2, 6-hexanetriol; ethylene glycol; diethylene glycol; trimethylol propane; trimethyolethane; pentaerythritol; 1, 5-pentanediol; sorbitol; and the like, including mixtures thereof.

Other polyhydric alcohols that can be employed in producing the polyester polyols useful in preparing the foams of this invention are the polymeric polyhydric alcohols which include the linear and branched chain polyethers having a plurality of acyclic ether oxygens and at least two alcoholic hydroxyl radicals. Illustrative of such polyether polyols are the poly (oxyalkylene) polyols containing one or more chains of connected oxyalkylene radicals which are prepared by the reaction of one or more alkylene oxides with acyclic and alicyclic polyols. Examples of the poly (oxyalkylene) polyols include the poly (oxethylene) glycols prepared by the addition of propylene oxide to water, propylene glycol or dipropylene glycol; mixed oxyethylene-oxypropylene poly-glycols prepared in a similar manner utilizing a mixture of ethylene oxide and propylene oxide or a sequential addition of ethylene oxide and propylene oxide; and the poly (oxybutylene) glycols and copolymers such as poly (oxyethylene-oxbutylene) glycols and poly (oxypropyleneoxbutylene) glycols. Included in the term "poly (oxybutylene) glycols" are polymers of 1, 2-butyleneoxide and 2, 3-butyleneoxide.

Illustrative of further polyester polyol reactants that are useful in producing flexible polyester urethane foam are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1, 2, 6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pryogallol, phloroglucinol, hydroquinone, 4, 6-tertiary-butylcathechol, and catechol; polynuclear hydroxybenzenes ("polynuclear: designating at least two benzene nuclei) such as di-, tri- and tetra-phenol compounds in which two to four hydroxybenzene groups are attached either directly by means of single bonds or through an aliphatic hydrocarbon radical containing one to twelve carbon atoms, such compounds being typically illustrated by 2, 2-bis (p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolacs.

The organic polyisocyanates that are useful in producing flexible polyester urethane foam are organic compounds that contain at least two isocyanato groups. Such compounds are well known in the art of producing polyurethane forms, and are conveniently represented by the general formula:

$$Q'(NCO)i$$

wherein: $i$ has an average value of at least two and is usually no more than six, and $Q'$ represents an aliphatic, cycloaliphatic or aromatic radical which can be an unsubstituted hydrocarbyl group or a hydrocarbyl group substituted, for example, with halogen or alkoxy. For example, $Q'$ can be an alkylene, cycloalkylene, arylene, alkyl-substituted cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1, 6-hexamethylene diisocyanate; 1, 4-tetramethylene diisocyanate; 1-methyl-2,4-diisocyanato-cyclohexane; bis(4-isocyanatophenyl) methane; 4-methoxy-1, 4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6-tolylene diisocyanates; crude tolylene diisocyanates; 6-isopropyl-1, 3-phenylenediisocyanate; durylene diisocyanate; triphenyl-methane-4,4',4''-triisocyanate; and other organic polyisocyanates known to the polyurethane art. Other suitable polyisocyanate reactants are ethyl-phosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

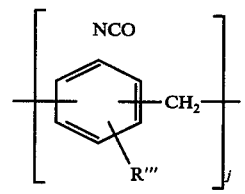

wherein $R'''$ is hydrogen and/or lower alkyl and $j$ has an average value of at least 2.1. Preferably the lower alkyl radical is methyl and $j$ has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low viscosity (50–500 centipoises at 25° C) liquids having average iscyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyester polyol and organic polyisocyanate usually constitute the major proportion by weight of the polyurethane-forming reaction mixture. In general, the polyisocyanate and polyester polyol reactants are employed in relative amounts such that the ratio of total —NCO equivalents to total active hydrogen equivalent (of the polyester polyol, the additives of the present invention and any water, when used) is from 0.8 to 1.5, preferably from 1.0 to 1.25, equivalents of —NCO per equivalent of active hydrogen. This ratio is known as the Isocyanate Index and is often expressed as a percent of the stoichiometric amount of polyisocyanate required to react with total active hydrogen. When expressed as a percent, the Isocyanate Index may be from 80 to 150, and is preferably within the range from about 100 to about 125.

The amount of the isocyanate constituent which is added should be adjusted to compensate for the total active hydrogen of the additive and/or additive and co-additive mixture of the present invention being utilized to provide the Isocyanate Index which is desired, preferably in the range as set forth herinbefore.

The urethane-forming reaction is effected in the presence of a minor amount of a catalyst, usually a tertiary amine. Suitable amine catalysts include, but are not limited to, one or more of the following: N-methylmorpholine; N-ethylmorpholine; N-octadecylmorpholine; triethylamine, tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., 1,4-diazabicyclo 2.2.2 octane); the formate and other salts of triethylenediamine, oxyalkylene adducts of the amino groups of primary and secondary amines and other such amine catalysts which are well known in the art of polyurethane manufacture. Also useful are the betatertiary-amino nitriles wherein the 2-cyanoalkyl group is bonded to acyclic tertiary amino nitrogen or to nitrogen of a morpholine or piperazine nucleus. Such catalysts are described in copending application Ser. No. 369,556, filed June 13, 1973 of W. R. Rosemund, M. R. Sandner and D. J. Trecker, now U.S. Pat. No. 3,925,268 and are exemplified by 3-dimethylamino-propionitrile as such or in combination with other tertiary amines such as bis[2-(N,N-dimethylamino)ethyl]ether. Other useful amine catalysts are set forth in U.S. Pat. No. 3,821,131. Although metal-containing catalysts such as stannous octoate are usually employed in the preparation of flexible polyether urethane foam, such metal catalysts are not preferred in the manufacture of flexible polyester foam.

It is to be understood that the aforesaid amines may be used as essentially the sole amine catalyst of the reaction mixtures employed in this invention or any combination of two or more such amines may be employed. The amine catalyst may also be introduced in the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol ("hexylene glycol").

It is to be understood that any of the aforesaid amine catalysts or solutions thereof can be added directly to the foam producing reaction mixture or they can be added in premixed form with water annd the foam stabilizers of this invention.

The amine catalyst may, in general, be present in the final foam-producing reaction mixture in an amount of from about 0.2 to about 8 parts by weight of active catalyst (that is, the amine exclusive of other components present in the solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed include methylene chloride, liquified gases which have boiling points below 80° F. and above −60° F., or other inert gases such as nitrogen, carbon dioxide added as such, methane, helium and argon. Suitable liquified gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,1-trifluoro-2-fluoro-3,3-difluoro-4,4 4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterphthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

As has been described, it is often desirable to utilize low combustibility or flame retardant additives. The organic flame retardants that can be employed to form the improved diecuttability polyester foams of the present invention can be chemically combined in one or more of the other reactants used (e.g., in the polyol or polyisocyanate), or they can be used as discrete chemical compounds added as such to the foam formulation. The organic flame retardants preferably contain phosphorus or halogen, or both phosphorus and halogen. Usually, the halogen, when present, is chlorine and/or bromine. Flame-retardants of the discrete chemical variety include: 2,2-bis(bromomethyl)-1,3-propanediol; 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl) ether of sorbitol; tetrachlorophthalic anhydride; chlorendic acid; chlorendic anhydride; diallyl chlorendate; chlorinated maleic anhydride; tris(2-chloroethyl)phosphate; [(ClCH$_2$CH$_2$O)$_3$ P(O)]; tris(2,3-dibromopropyl)phosphate; tris(1,3-dichloropropyl)phosphate; tris(1-bromo-3-chloroisopropyl)phosphate; tris(1,3-dichloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate and 0,0-diethyl-N,N-bis(2-hydroxyethyl)aminomethyl phosphonate. Also suitable are compounds having the formulas:

and

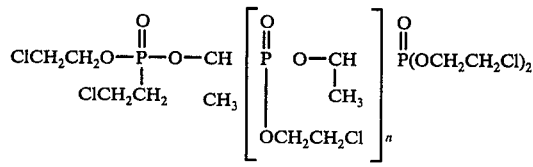

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

The flame-retarding agent can be present in the foam formulations described herein in an amount from about 1 to about 30 parts by weight per 100 parts by weight of the polyester polyol reactant, the particular amount employed depending largely on the efficiency of any given agent in reducing flammability.

Those of the above flame-retardants of the discrete chemical compound variety which contain groups reactive with hydroxy or isocyanato groups can be used as reactants in producing the polyester polyols or can be reacted with organic polyisocyanates to produce modified polyols or polyisocyanates having chemically combined flame-retardant groups. Such modified polyester and polyisocyanates are useful as reactants in the process of this invention. In such cases, due regard must be given to the possible effect of the functionality of the compound on the other properties (e.g., degree of flexibility) of the resulting foam.

In producing cellular polyurethanes in accordance with the method of this invention, a minor amount of an organosilicone or a silicone-free, organic surfactant may also be present as an additional component of the polyurethaneforming reaction mixture, organosilicone surfactants being preferred. When used, such surfactants are usually present in amounts up to about 5 parts by weight per 100 parts by weight of total polyol reactant.

Suitable classes of silicone surfactants are the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like structure. Usually, the polysiloxane blocks are trialkylsiloxy-endblocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms including alkyl, aryl, aralkyl, bicycloheptyl and halogen-substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like.

A second type of foam-stabilizing component which can be present in the formulations described herein are the branched block copolymers described in U.S. Pat. No. 2,834,748. Organosilicone foam stabilizers described in the latter patent include those containing a trifunctional siloxy unit to which three polyoxyalkylene blocks are bonded through dialkyl-substituted siloxy units. A preferred group are those having the formula, MeSi[OSiMe$_2$)$_d$(OC$_a$H$_{2a}$)$_b$OR]$_3$, wherein Me is methyl, $d$ has a value of at least one, $a$ is from 2 to 3, $b$ has a value of at least 5, and R is hydrogen or a monovalent hydrocarbyl group such as lower alkyl, butyl being especially suitable.

Other useful foam-stabilizing components are block copolymers wherein the polysiloxane blocks are trialkylsiloxyendblocked and contain recurring difunctional dialkylsiloxy monomeric units in combination with reoccuring difunctional cyanoalkyl-alkylsiloxy or cyanoalkoxy-alkylsiloxy monomeric units, the mole ratio of the dialkylsiloxy units to the cyanosubstituted siloxy units being about 10–200:3–100, and wherein the polysiloxane and polyoxyalkylene blocks are joined through an Si-C or an Si-O-C linkage, and from about 20 to about 65 weight percent of the oxyalkylene content of the polyoxyalkylene blocks is constituted of oxyethylene units. These block copolymers are described and claimed in copending application Ser. No. 279,883, filed Aug. 11, 1972, in the names of Bela Prokai and Bernard Kanner, now U.S. Pat. No. 3,846,462. A preferred class of such surfactants are the cyanopropyl-substituted block copolymers having the average formula,

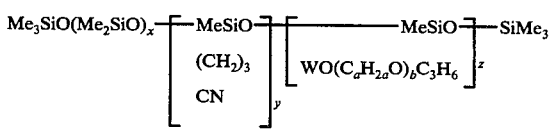

wherein: Me represents methyl; W represents a monovalent hydrocarbyl group (R'—), an acyl group

[R'C(O)—] or a carbamyl group [R'NHC(O)—], the said R' group having from 1 to 12 carbon atoms; $x$ has an average value of from about 20 to about 100; $y$ has an average value of from about 4 to about 30; $z$ has an average value of from about 2 to about 10; $a$ has a value of from 2 to 4, provided from about 20 to about 65 weight percent of the oxyalkylene units of the polyoxyalkylene chain, —$(C_aH_{2a}O)_b$—, are constituted of oxyethylene; and $b$ has an average value such that the average molecular weight of the polyoxyalkylene chain is from about 1000 to about 6000.

Still further suitable silicon-containing foam stabilizers include the polysiloxane-polyoxyalkylene block copolymers described, for example, in U.S. Pat. Nos. 3,563,924 and 3,594,334. Such copolymers include those characterized by a particular molecular weight (600-17000), siloxane content (14-40 weight percent based on the weight of the copolymer) and oxyethylene content (at least 75 weight percent based on the total amount of oxyalkylene groups in the copolymer). The organosilicones are usually employed in combination with an anionic, silicon-free organic emulsifier such as those described in said U.S. Pat. No. 3,594,334, the teachings of which are incorporated herein by reference. Also effective as stabilizers are the organosilicones containing tetrafunctional $SiO_{4/2}$ units described and claimed in copending application Ser. No. 132,534, filed Apr. 8, 1971, in the names of Bela Prokai and Bernard Kanner, now U.S. Pat. No. 3,793,360. Of this class of stabilizers, those having the following average formula are particularly preferred:

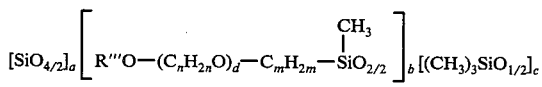

wherein $n$ has a value of 2 to 4 inclusive; $d$ has an average value of from about 5 to about 15; $m$ has a value of from 2 to 4; a:b:c has an average value of 0.4-2:1:0.2-2, and R''' is phenyl, lower alkyl, lower alkaryl or aryl-substituted lower alkyl groups. Particularly effective are polymers in which at least a major proportion of the poly(oxyalkylene) chains are terminated by R°°°O- groups where the organic cap (R°°°) is methyl or benzyl.

Still further useful silicone surfactants include cyanopropyl-substituted polymethylsiloxane-polyoxyehtylene copolymers described in copending application Ser. No. 457,510, filed Apr. 3, 1974, of Bela Prokai and Bernard Kannen, now U.S. Pat. No. 3,954,824. Other useful silicone surfactants comprise the cyanoalkoxyalkyl-modified polyalkylsiloxane-polyoxyethylene copolymers described in copending application Ser. No. 536,884, filed Dec. 27, 1974, of Bela Prokai and Bernard Kannen, now U.S. Pat. No. 3,979,419.

Silicon-free, organic surfactants or emulsifiers suitable as stabilizers of the polyester polyol-based urethane foams described herein are known to the art and are employed in amounts up to about 5 p.p.h.p. One class of organic emulsifiers suitable for this purpose are products obtained by the reaction of amines such as, in particular, diethylamine, with long chain fatty acids such as oleic acid or with sulfonated $C_{10}$-$C_{15}$ alkylated aromatic hydrocarbons. Another class are the liquid, anionic organic surfactants having at least one carbon-bonded sulfonic acid group, —$SO_3H$, or an ammonium, quaternary ammonium, alkali metal or alkaline earth metal derivative of said sulfonic acid group. The sulfonic acids groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 20 or more carbon atoms such as alkanes, high alkyl-substituted benzenes, and liquid petroleum fractions, as typically illustrated by sodium tetradecyl sulfonate, sodium dodecylbenzene sulfonate and sodium and potassium salts of sulfonated mineral oil. The —$SO_3H$ group or salt derivative thereof may also be a substituent on an organic backbone consisting of carbon, hydrogen and oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. These and other organic stabilizers of polyester polyol-derived urethane foams are known to the art; see, for example, the description thereof in U.S. Pat. No. 3,594,334.

If desired, other additional ingredients can be employed in minor amounts in producing the polyurethane foams in accordance with the process of this invention. Illustrative of such additives that can be employed are: compression set additives (e.g., hexylene glycol); additives to regulate cell structure so as to coarsen cells and thereby reduce the tendency of the foam to split (e.g., paraffin oil); fillers; dyes; pigments; anti-discoloration additives including anti-scorch and anti-oxidation agents; and the like.

The process described herein for the production of flexible polyester urethane foam is usually carried out as a "one-shot" process in which the polyester polyol and polyisocyanate reactants are independently added to the foam-producing reaction mixture. The foaming and urethane-forming reactions occur without the application of external heat. Often the resulting foam is cured by heating the foam at a temperature between about 100° C and about 150° C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible polyester urethane foams are not narrowly critical. The polyester polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosilicone polymeric foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the additives of the present invention are present in an amount sufficient to enhance the diecuttability of the resulting polyester foam. The preferred amounts of these various components are as given hereinbefore.

The following examples are merely illustrative of the present invention and are not intended as a limitation upon the scope thereof. Unless otherwise indicated, all parts are by weight.

Definitions

As used in the Examples appearing hereinafter, the following designations, symbols, terms and abbreviations have the indicated meanings:

| | |
|---|---|
| Resin A | A standard trimethylolpropane-based polyester resin having a hydroxyl number of about 50 |
| Resin B | A glycerol-based polyester resin having a hydroxyl number of about 50 |
| Resin C | A triomethylolpropane-based polyester resin having a hydroxyl number of about 60 |
| Catalyst | A mixture of about 95% weight percent 3-Dimethyl-aminopropionitrile and 5 weight percent bias (2-dimethyl-aminoethyl)ether |
| Silicone Surfactant | A composition containing, as the organic silicone surfactant, a cyanopropyl-substituted polymethylsiloxane hydride having the average composition: $Me_3SiO[Me_2SiO]_{3.3}[MeSiO]_{4.3}[MeSiO]_{6.8}SiMe_3$ with side groups $(CH_2)_3CN$ and $C_3H_6(OC_2H_4)_8OMe$ wherein the polyether and siloxane contents are about 68 and 32 weight percent, respectively, present in an amount of about 20 weight percent. The composition also contains, by weight, about 17.5 percent tall oil, 10 percent hexylene glycol, 35 percent of an anionic surfactant (a sodium petroleum sulfonate having an average molecular weight of 420 and a mineral content of 33 weight percent), 17.5 percent of a non-ionic surfactant (the hydrophobe is a mixture of $C_{11-15}$ linear alcohols and the hydrophile is ethylene oxide present in an average amount of 9 mols/mol of hydrophobe) and about 2500 ppm 2,6-di-tertiary-butyl-p-cresol. |
| Non-ionic surfactant | The hydrophobe is a mixture of $C_{11}$–$C_{15}$ alcohols and the hydrophile is ethylene oxide (average amount- 9 mols/mol of the hydrophobe) |
| Organic Surfactant A | Sulfated or sulfonated fatty acid ester, available from Witco Chemical Company, and identified as "77–86" |
| Organic Surfactant B | Diethylammonium oleate, available from Witco Chemical Company or Mobay, and identified as "10-58" |
| Organic Surfactant C | A proprietary organic surfactant available from Mobay and identified as "6682-A" |
| Flame Retardant A | $(ClCH_2)_2C[CH_2OP(OCH_2CH_2Cl)_2]_2$ available from Monsanto Chemical Company ("Phosgard 2XC-20") |
| Tolylene Diisocyanate or TDI 80/20 | A mixture of about 80 weight percent 2,4-tolylene diisocyanate and about 20 weight percent 2,6-tolylene diisocyanate |
| TDI Blend 75/25 | A 75/25 weight percent mixture of (a) TDI 80/20 and (b) 65/35 2,4-tolylene diisocyanate and 2,6-tolylene diisocyanate |
| Cream Time (seconds) | The time in seconds which it takes for the foam-forming mixture to go from a homogeneous clear liquid to a heterogeneous milky liquid |
| Rise Time (seconds) | The time in seconds which it takes the foam to reach its maximum height |
| Breathability | The porosity of a foam, being roughly proportional to the number of open cells in a foam and being measured in accordance with the NOPCO breathability test procedure described by R. E. Jones and G. Fesman, Journal of Cellular Plastics, January, 1965. This is a measure of the air flow through a 2-inch by 2-inch by 1-inch foam sample, expressed as standard cubic feet per minute. |
| Cells Per Inch | The number of cells per linear inch of the foam, the number being directly proportional to the fineness of the cell structure. |
| Density | The density of the foam in pounds per cubic foot. |
| DPG | Dipropylene glycol |
| GLY | Glycerol |
| ERY | Erythritol |
| TMP | Trimethylolpropane |
| DEOA | Diethanolamine |
| TEOA | Trioethanolamine |
| PPO A | A polypropylene oxide-glycerol adduct having a hydroxyl number of about 237.5 |
| PPO B | A polypropylene oxide-sucrose adduct having a hydroxyl number of about 490 |
| PPO C | A polypropylene oxide-diethylenetriamine adduct having a hydroxyl number of about 700 |
| Flame Retardant B | tris(2,3-dibromopropyl) phosphate available from Michigan Chemical Company and identified as "LVT23P" |
| Flame Retardant C | tris(2-chloroethyl) phosphate available from Stauffer Chemical Company and identified as "CEF" |
| Flame Retardant D | A polymeric chloroethylphosphate available from Olin Corp. and identified as "Thermolin 101" |
| Co-Additive A | A sodium petroleum sulfonate anionic surfactant having an average molecular weight of 420 and a mineral content of 33 weight percent |
| Flame Retardant E | A mixture of tris(2,3-dichloropropyl) phosphate and tris-2(1,3-dichloropropyl) phosphate, available from Stouffer Chemical Company and identified as "Fyrol FR2" |
| Organic Surfactant D | An organic surfactant available from Witco Chemical Company and identified as "M-6682-A" |
| Tensile strength | ASTM D1564-69 |
| Tear resistance | ASTM D1564-69 |
| ILD | ASTM D1564-69 |
| Compression Set | ASTM D1564-69 |

DIECUTTABILITY TESTS

The diecuttability was tested by clicking half-inch sheets with a tensile dumbbell die on a United Shoe Machinery Clicker Press. Recovery time of the foam was measured as percent recovery in less than 15 seconds, at 15 seconds, 30 seconds and 60 seconds. Measurements are made by visual inspection on the cut samples.

the isocyanate index; Examples 4 and 5 compare increased index with a blend of tolylene diisocyanates; Examples 2, 6 and 7 compare various commercial polyester resins, and Example 8 illustrates the improvement in diecuttability when the low combustibility additive is removed, particularly by comparison with Examples 2 and 9.

As can be seen in Table I following, none of the foams in these examples possess optimum diecuttability characteristics.

TABLE 1

| Example | 1 | 2 | 3 | 4 | 5 | 6 | 7 | 8 | 9 | 10 | 11 |
|---|---|---|---|---|---|---|---|---|---|---|---|
| Resin Type | A | A | A | A | A | B | C | A | A | A | A |
| Resin | 100.0 | 100.0 | 100.0 | 100.0 | 100.0 | 100.0 | 100.0 | 100.0 | 100.0 | 100.0 | 100.0 |
| Water | 3.6 | 3.6 | 3.6 | 3.6 | 3.6 | 3.6 | 3.6 | 3.6 | 3.6 | 3.6 | 3.6 |
| Catalyst | 2.0 | 2.0 | 2.0 | 2.0 | 2.0 | 2.0 | 2.0 | 2.0 | 2.0 | 2.0 | 2.0 |
| Hexdecyldimethylamine | 0.30 | 0.30 | 0.30 | 0.30 | 0.30 | 0.30 | 0.30 | 0.30 | 0.30 | 0.30 | 0.30 |
| Silicone Surfactant | — | 1.0 | 1.0 | 1.0 | 1.0 | 1.0 | 1.0 | 1.0 | 2.0 | — | — |
| Non-Ionic Surfactant | — | 0.50 | 0.50 | 0.50 | 0.50 | 0.50 | 0.50 | 0.50 | — | — | — |
| Organic Surfactant A | 1.6 | — | — | — | — | — | — | — | — | — | — |
| Organic Surfactant B | 1.0 | — | — | — | — | — | — | — | — | — | — |
| Organic Surfactant C | — | — | — | — | — | — | — | — | — | 1.0 | 1.0 |
| Flame Retardant A | 7.0 | 7.0 | 7.0 | 7.0 | 7.0 | 7.0 | 7.0 | — | — | — | — |
| Tolylene Diisocyanate | 49.0 | 49.0 | 53.2 | — | — | 49.2 | 50.7 | 49.0 | 46.8 | 46.8 | 46.8 |
| TDI Blend 75/25 | — | — | — | 49.0 | 51.1 | — | — | — | — | — | — |
| TDI Index | 115 | 115 | 125 | 115 | 120 | 115 | 115 | 115 | 110 | 110 | 110 |
| Cream Time, Seconds | 14 | 13 | 13 | 16 | 13 | 13 | 12 | 11 | 12 | 10 | 11 |
| Rise Time, Seconds | 93 | 77 | 80 | 85 | 73 | 78 | 70 | 66 | 71 | 56 | 57 |
| Breathability, SCFM | 1.3 | 0.65 | 0.45 | 0.80 | 0.75 | 0.50 | 0.75 | 0.80 | 0.85 | 0.50 | 1.75 |
| Cells Per Inch | 25–30 | 45–50 | 45–50 | 30–35 | 45–50 | 45–50 | 45–50 | — | 45–50 | 45–50 | 40–45 |
| Density, pcf | 1.92 | 1.87 | 1.84 | 1.86 | 1.83 | 1.87 | 1.83 | 1.75 | 1.71 | 1.78 | 1.69 |
| Diecuttability Recovery, % after 5–15 Seconds | — | — | — | — | — | — | — | — | — | — | — |
| 15 Seconds | 20 | 5 | 8 | 10 | 3 | 3 | 50 | 80 | 50 | 5 | 15 |
| 30 Seconds | 55 | 8 | 13 | 20 | 7 | 4 | 87 | 85 | 80 | 10 | 30 |
| 60 Seconds | 75 | 10 | 18 | 55 | 9 | 7 | 95 | 90 | 90 | 15 | 45 |

PROCEDURE FOR PREPARATION OF THE POLYESTER FOAM

The foam stabilizer, amine catalysts, additives of the present invention (except, of course, where a control was formed) and water were premixed in a beaker. The polyester polyol was weighed into a container, and the isocyanate was then added and mixed with a spatula until homogeneous. Further mixing was done on a drill press equipped with a double 3-bladed, marine-type propeller about 3 inches in diameter. The mixing in the drill press was accomplished at 1,000 rpm for about 8 seconds. The premixture of foam stabilizer, amine catalysts, additives and water was added and mixing continued for about 7 additional seconds. The reaction mixture was poured into a one foot by one foot by one foot cardboard box and allowed to cure and rise to its maximum height. The foam was then postcured for about 30 minutes at 120° C. All the foams were then removed from the oven and aged overnight at ambient temperature before being processed and observed for properties.

EXAMPLES 1 to 11

Several different formulations were tested to provide an indication of the extent of the diecuttability problem when low combustibility additives are added to typical polyester foam formulations. Examples 1, 10 and 11 show the effects of the use of various organic surfactants; Examples 2 and 3 illustrate the effect of increasing

EXAMPLES 12 to 26

These Examples illustrate the effect of various low molecular weight polyols on diecuttability. Examples 12–14 illustrate the use of dipropylene glycol, Examples 15–18 show the use of glycerol, Examples 19–20 use erythritol, Example 21 illustrates the use of trimethylolpropane, Example 22 shows the use of diethanolamine, Example 23 uses triethanolamine and Examples 24–26 illustrate the use of various low molecular weight polypropylene oxide-based polyols.

The results are set forth in Table II. As can be seen, glycerol provides the most improvement in diecuttability while erythritol, trimethylolpropane, diethanolamine, and polypropylene oxide adducts A and C are also effective. Materials such as dipropylene glycol, triethanolamine and polypropylene oxide adduct B were relatively ineffective. In addition, as can be seen from Examples 15–18, the use of one part glycerol provides excellent initial and final recovery values (Example 15); however, when a low combustibility additive is included, recovery is dimished at 0.6 parts glycerol (Example 16) but is quite satisfactory at one part (Example 17). A further increase in the isocyanate index to 120 (Example 18) does not significantly improve diecuttability. It is also apparent that the level of enhancement (if any) of the diecuttability characteristics caused by the additive cannot be predicted solely on the basis of the hydroxyl number of the additive.

TABLE II

| Example | | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| Resin A | 100.0 | ← | | | | | | | | | | | | | | → |
| Water | 3.6 | | | | | | | | | | | | | | | |
| Catalyst | 2.0 | | | | | | | | | | | | | | | |
| Hexadecyldimethylamine | 0.3 | | | | | | | | | | | | | | | |
| Silicone Surfactant | 1.0 | | | | | | | | | | | | | | | |
| Non-Ionic Surfactant | 0.5 | | | | | | | | | | | | | | | |
| Flame Retardant A | | — | 7.0 | 7.0 | — | 7.0 | 7.0 | 7.0 | 7.0 | 7.0 | 7.0 | 7.0 | 7.0 | 7.0 | 7.0 | 7.0 |
| Additive | | DPG | DPG | DPG | Gly | Gly | Gly | Gly | Ery | Ery | TMP | DEOA | TEOA | PPOA | PPOB | PPOC |
| Parts | | 1.8 | 1.8 | 0.6 | 1.0 | 0.6 | 1.0 | 1.0 | 1.0 | 1.5 | 1.4 | 1.0 | 1.5 | 6.0 | 3.0 | 2.0 |
| Hydroxyl Number | | 836 | 836 | 836 | 1827 | 1827 | 1827 | 1827 | 1838 | 1838 | 1255 | 1601 | 1128 | 238 | 490 | 700 |
| Tolylene Diisocyanate | | 51.6 | 51.6 | 49.8 | 52.2 | 50.9 | 52.2 | 54.5 | 54.5 | 56.2 | 52.2 | 51.7 | 52.0 | 51.4 | 51.5 | 51.5 |
| Index | | 115 | 115 | 115 | 115 | 115 | 115 | 120 | 120 | 120 | 115 | 115 | 115 | 115 | 115 | 115 |
| Cream Time, seconds | | 15 | 15 | 14 | 16 | 16 | 16 | 12 | 13 | 15 | 13 | 13 | 13 | 13 | 13 | 7 |
| Rise Time, seconds | | 80 | 87 | 84 | 82 | 86 | 90 | 68 | 77 | 86 | 79 | 80 | 79 | 86 | 83 | 85 |
| Breathability, SCFM | | 0.45 | 0.45 | 0.40 | 1.95 | 0.95 | 0.80 | 1.20 | 0.85 | 1.65 | 0.45 | 1.15 | 0.95 | 1.9 | 0.45 | Top Shrink |
| Cells Per Inch | | 45–50 | 45–50 | 45–50 | — | — | 40–45 | — | — | — | 45–50 | 40–45 | 45–50 | — | — | — |
| Density, pcf | | 1.85 | 1.94 | 1.95 | 1.64 | 1.85 | 1.86 | 1.86 | 1.83 | 1.71 | 1.80 | 1.72 | 1.81 | 1.95 | 1.96 | — |
| Diecutability Recovery, % after 5–15 seconds | | | | | | | | | | | | | | | | |
| 15 seconds | | 28 | 5 | 5 | 95 | 73 | 90 | 88 | 40 | 90 | 15 | 20 | 3 | 45 | 10 | 95 |
| 30 seconds | | 73 | 8 | 8 | 98 | 85 | 95 | 98 | 70 | 98 | 25 | 45 | 6 | 75 | 20 | 98 |
| 60 seconds | | 93 | 10 | 9 | 99 | 95 | 98 | 98 | 95 | 99 | 65 | 75 | 7 | 93 | 28 | 98 |

EXAMPLES 27 to 34

These Examples illustrate the efficiency of the use of glycerol in enhancing diecuttability characteristics when a variety of low combustibility additives are included in the polyester foam formulation.

The results are set forth in Table III. As can be seen, glycerol functioned effectively to yield forms of improved diecuttability relative to that expected from similar formulations without glycerol (compare Example 2). Also, in general, as the amount of the low combustibility additive was increased, diecuttability was correspondingly adversely affected.

TABLE III

| Example | | 27 | 28 | 29 | 30 | 31 | 32 | 33 | 34 |
|---|---|---|---|---|---|---|---|---|---|
| Resin A | 100.0 | | | | | | | | |
| Water | 3.6 | | | | | | | | |
| Catalyst | 2.0 | | | | | | | | |
| Hexadecyldimethylamine | 0.3 | | | | | | | | |
| Silicone Surfactant | 1.0 | | | | | | | | |
| Non-Ionic Surfactant | 0.5 | | | | | | | | |
| Flame Retardant A | | 5.0 | 10.0 | — | — | — | — | — | — |
| Flame Retardant B | | — | — | 5.0 | 10.0 | — | — | — | — |
| Flame Retardant C | | — | — | — | — | 5.0 | 10.0 | — | — |
| Flame Retardant D | | — | — | — | — | — | — | 5.0 | 10.0 |
| Glycerol | 1.0 | | | | | | | | |
| TDI | 52.2 | | | | | | | | |
| Index | 115 | | | | | | | | |
| Cream Time, Seconds | | 15 | 15 | 15 | 16 | 15 | 15 | 16 | 16 |
| Rinse Time, Seconds | | 86 | 91 | 82 | 86 | 79 | 81 | 78 | 84 |
| Breathability, SCFM | | 1.40 | 1.35 | 1.35 | 0.85 | 1.0 | 2.15 | 1.45 | 0.75 |
| Cells Per Inch | | — | — | — | — | — | — | — | — |
| Density, pcf | | 1.75 | 1.83 | 1.77 | 1.89 | 1.79 | 1.81 | 1.70 | 1.87 |
| Comments | | OK | OK | Scorch | Scorch | OK | Slight Scorch | OK | OK |
| Diecuttability Recover, % after 5–15 Seconds | | — | — | 90 | — | 92 | — | — | — |
| 15 Seconds | | 40 | 20 | 94 | 13 | 98 | 93 | 58 | 68 |
| 30 Seconds | | 87 | 63 | 98 | 40 | 99 | 98 | 93 | 90 |
| 60 Seconds | | 90 | 90 | 98 | 78 | 99 | 98 | 98 | 97 |

EXAMPLES 35 to 43

These Examples illustrate the use of varying glycerol amounts together with a silicone surfactant. Specifically, glycerol was employed at levels of 0.5 parts, 0.75 parts and 1.0 parts while the surfactant levels were 1.0 parts, 1.5 parts and 2.0 parts.

The results are set forth in Table IV. As can be seen, these Examples illustrate that acceptable diecuttability can be achieved with reduced glycerol levels when the level of the silicone surfactant is correspondingly increased.

TABLE IV

| Example: | 35 | 36 | 37 | 38 | 39 | 40 | 41 | 42 | 43 |
|---|---|---|---|---|---|---|---|---|---|
| Resin A | 100.0 | 100.0 | 100.0 | 100.0 | 100.0 | 100.0 | 100.0 | 100.0 | 100.0 |
| Water | 3.6 | 3.6 | 3.6 | 3.6 | 3.6 | 3.6 | 3.6 | 3.6 | 3.6 |
| Catalyst | 2.0 | 2.0 | 2.0 | 2.0 | 2.0 | 2.0 | 2.0 | 2.0 | 2.0 |
| Hexadecyldimethylamine | 0.3 | 0.3 | 0.3 | 0.3 | 0.3 | 0.3 | 0.3 | 0.3 | 0.3 |
| Silicone Surfactant | 1.0 | 1.0 | 1.0 | 2.0 | 2.0 | 2.0 | 1.5 | 1.5 | 1.5 |
| Glycerol | 0.50 | 0.75 | 1.0 | 0.50 | 0.75 | 1.0 | 1.0 | 1.0 | 0.50 |
| Flame Retardant A | 7.0 | 7.0 | 7.0 | 7.0 | 7.0 | 7.0 | 7.0 | 7.0 | 7.0 |
| Tolylene Diisocyanate | 50.7 | 51.4 | 52.2 | 50.7 | 51.4 | 52.2 | 51.4 | 52.2 | 50.7 |
| Index | 115 | 115 | 115 | 115 | 115 | 115 | 115 | 115 | 115 |
| Cream Time, Seconds | 12 | 12 | 12 | 13 | 13 | 13 | 13 | 13 | 13 |
| Rinse Time, Seconds | 75 | 77 | 80 | 82 | 86 | 82 | 83 | 90 | 81 |
| Breathability, SCFM | 0.90 | 2.6 | 2.5 | 1.4 | 1.6 | 1.3 | 2.1 | 2.3 | 1.25 |
| Cells Per Inch | 45–50 | 40–45 | 40–45 | 45–50 | 45–50 | 40–45 | 45–50 | 40–45 | 45–50 |
| Density, pcf | 1.82 | 1.73 | 1.71 | 1.72 | 1.73 | 1.68 | 1.75 | 1.72 | 1.79 |
| Diecuttability, Recovery % after 5–15 Seconds | — | — | — | — | 90 | 90 | — | — | — |
| 15 Seconds | 40 | 7 | 38 | 53 | 94 | 94 | 43 | 88 | 10 |
| 30 Seconds | 68 | 50 | 75 | 93 | 98 | 98 | 75 | 98 | 13 |
| 60 Seconds | 90 | 80 | 88 | 98 | 98 | 98 | 93 | 98 | 23 |

EXAMPLES 44 to 53

These Examples illustrate the use of various petroleum sulfonates (viz. - Organic surfactant A and Co-additive A) and dialkylammonium oleate (viz. - Organic surfactant B) as co-additives with glycerol.

The results are set forth in Table V. As can be seen from Examples 46 and 47, the use of the co-additives alone does not significantly improve diecuttability relative to the control (Example 44). The use of such co-additives does however allow the use of a lower level of glycerol to be employed yet still yielding satisfactorily improved diecuttability.

TABLE V

| Example | 44 | 45 | 46 | 47 | 48 | 49 | 50 | 51 | 52 | 53 |
|---|---|---|---|---|---|---|---|---|---|---|
| Resin A | 100.0 | 100.0 | 100.0 | 100.0 | 100.0 | 100.0 | 100.0 | 100.0 | 100.0 | 100.0 |

TABLE V-continued

| Example | 44 | 45 | 46 | 47 | 48 | 49 | 50 | 51 | 52 | 53 |
|---|---|---|---|---|---|---|---|---|---|---|
| Water | 3.6 | 3.6 | 3.6 | 3.6 | 3.6 | 3.6 | 3.6 | 3.6 | 3.6 | 3.6 |
| Catalyst | 2.0 | 2.0 | 2.0 | 2.0 | 2.0 | 2.0 | 2.0 | 2.0 | 2.0 | 2.0 |
| Hexadecyldimethylamine | 0.3 | 0.3 | 0.3 | 0.3 | 0.3 | 0.3 | 0.3 | 0.3 | 0.3 | 0.3 |
| Silicone Surfactant | 1.0 | 1.0 | 1.0 | 1.0 | 2.0 | 1.0 | 2.0 | 1.0 | 1.0 | 1.0 |
| Non-ionic Surfactant | 0.5 | 0.5 | 0.5 | 0.5 | 0.5 | 0.5 | 0.5 | — | 0.5 | 0.5 |
| Glycerol | 1.0 | — | 1.0 | 1.0 | — | 1.0 | 0.75 | 0.75 | 0.75 | 0.50 |
| Co-additive A | — | — | — | — | — | — | — | 0.50 | 0.50 | 0.50 |
| Organic Surfactant A | — | 0.6 | 0.6 | — | — | — | — | — | — | — |
| Organic Surfactant B | — | 0.4 | 0 | 0.4 | — | — | — | — | — | — |
| Flame Retardant A | 7.0 | 7.0 | 7.0 | 7.0 | 7.0 | 7.0 | 7.0 | 7.0 | 7.0 | 7.0 |
| Tolylene Diisocyanate | 52.2 | 49.0 | 52.2 | 52.2 | 49.0 | 52.2 | 51.4 | 51.4 | 51.4 | 50.7 |
| Index | 115 | 115 | 115 | 115 | 115 | 115 | 115 | 115 | 115 | 115 |
| Cream Time, seconds | 17 | 15 | 17 | 18 | 15 | 13 | 13 | 13 | 13 | 13 |
| Rise Time, seconds | 100 | 86 | 110 | 111 | 88 | 81 | 84 | 87 | 93 | 87 |
| Breathability, SCFM | 1.45 | 0.60 | 2.0 | 1.75 | 1.0 | 2.2 | 1.9 | 0.45 | 0.45 | 0.65 |
| Density, pcf | 1.78 | 1.87 | 1.85 | 1.90 | 1.90 | 1.74 | 1.72 | 1.70 | 1.70 | 1.70 |
| Diecuttability, Recovery % | | | | | | | | | | |
| after 15 seconds | 99 | — | 90 | 95 | — | 85 | — | 95 | — | 93 |
| 15 seconds | 99 | 10 | 99 | 95 | 28 | 98 | 42 | 98 | 75 | 97 |
| 30 seconds | 100 | 12 | 100 | 98 | 39 | 98 | 80 | 99 | 88 | 98 |
| 60 seconds | 100 | 23 | 100 | 98 | 60 | 98 | 95 | 99 | 95 | 98 |
| | | Control | | | | Control | | | | |

EXAMPLES 54 to 61

These Examples illustrate the use of glycerol in accordance with the present invention together with a petroleum oil sulfonate as a co-additive in a diluent formulation which provides satisfactory compatibility and reduction in viscosity to permit easy handling. The blend, identified as "Blend A", is set forth below:

| Component | Weight Percent |
|---|---|
| Glycerol | 50 |
| Co-additive A | 30 |
| Non-ionic surfactant | 15 |
| Organic silicone surfactant (identified in silicone surfactant definition) | 5 |

Some layering out was observed in the mixture of the additive, co-additive and the organic silicone surfactant; however, addition of the non-ionic surfactant eliminated this.

The results are set forth in Table VI. As shown, the use of the blend provides essentially equivalent overall diecuttability characteristics to that resulting from the use of the principal additive by itself. Further, as illustrated in Examples 59–61, increases in the isocyanate index at a constant level of the blend provide only slight improvements in ultimate diecuttability recovery (i.e-after 60 seconds).

TABLE VI

| Example | 54 | 55 | 56 | 57 | 58 | 59 | 60 | 61 |
|---|---|---|---|---|---|---|---|---|
| Resin A | 100.0 | 100.0 | 100.0 | 100.0 | 100.0 | 100.0 | 100.0 | 100.0 |
| Water | 3.6 | 3.6 | 3.6 | 3.6 | 3.6 | 3.6 | 3.6 | 3.6 |
| Catalyst | 2.0 | 2.0 | 2.0 | 2.0 | 2.0 | 2.0 | 2.0 | 2.0 |
| Hexadecyldimethylamine | 0.3 | 0.3 | 0.3 | 0.3 | 0.3 | 0.3 | 0.3 | 0.3 |
| Silicone Surfactant | — | 1.0 | 1.0 | 1.0 | 1.0 | 1.0 | 1.0 | 1.0 |
| Organic Surfactant A | 1.6 | — | — | — | — | — | — | — |
| Organic Surfactant B | 1.0 | — | — | — | — | — | — | — |
| Non-ionic Surfactant | — | — | — | — | 0.50 | — | — | — |
| Glycerol | — | — | — | — | 1.0 | — | — | — |
| Blend A | — | 0.75 | 1.0 | 1.25 | — | 1.0 | 1.0 | 1.0 |
| Flame Retardant A | 7.0 | 7.0 | 7.0 | 7.0 | 7.0 | 7.0 | 7.0 | 7.0 |
| Tolylene Diisocyanate | 49.0 | 50.1 | 50.7 | 50.9 | 52.2 | 48.4 | 50.6 | 52.8 |
| Index | 115 | 115 | 115 | 115 | 115 | 110 | 115 | 120 |
| Cream Time, seconds | 14 | 13 | 14 | 14 | 13 | 14 | 13 | 13 |
| Rise Time, seconds | 93 | 82 | 85 | 91 | 82 | 86 | 86 | 88 |
| Breathability, SCFM | 1.30 | 1.15 | 1.20 | 1.25 | 2.45 | 0.65 | 1.45 | 1.35 |
| Density, pcf | 1.92 | 1.74 | 1.70 | 1.72 | 1.71 | 1.83 | 1.72 | 1.72 |
| Diecuttability, Recovery % | | | | | | | | |
| after 15 seconds | — | — | — | — | 90 | — | — | 83 |
| 15 seconds | 22 | 40 | 30 | 85 | 94 | 25 | 44 | 94 |
| 30 seconds | 55 | 80 | 40 | 97 | 98 | 63 | 85 | 98 |
| 60 seconds | 78 | 97 | 80 | 98 | 98 | 90 | 97 | 98 |
| | Control | | | | Control | | | |

EXAMPLES 62 to 71

The effect on diecuttability due to the addition of n-coco morpholine in contrast to the enhancement imparted by an additive according to the present invention is illustrated.

The results are set forth in Table VII. As can be seen, the addition of n-coco morpholine does not improve the diecuttability in either a system stabilized with a surfactant (compare Examples 62 and 63) or in systems having a glycerol additive in accordance with the present invention (compare Examples 64 and 65). In contrast, the substitution of Blend A is effective in improving diecuttability in accordance with the present invention when used in place of n-coco morpholine in an organic surfactant stabilized foam (compare Example 68 with Example 69). Further advantage may perhaps be evident from the fact that the density of the foam containing Blend A is also lower than that containing n-coco morpholine.

Table VII

| Examples | 62 | 63 | 64 | 65 | 66 | 67 | 68 | 69 | 70 | 71 |
|---|---|---|---|---|---|---|---|---|---|---|
| Resin A | 100.0 | 100.0 | 100.0 | 100.0 | 100.0 | 100.0 | 100.0 | 100.0 | 100.0 | 100.0 |

Table VII-continued

| Examples | 62 | 63 | 64 | 65 | 66 | 67 | 68 | 69 | 70 | 71 |
|---|---|---|---|---|---|---|---|---|---|---|
| Water | 3.6 | 3.6 | 3.6 | 3.6 | 3.6 | 3.6 | 3.6 | 3.6 | 4.0 | 4.0 |
| Catalyst | 2.0 | 2.0 | 2.0 | 2.0 | 2.0 | 2.0 | 2.0 | 2.0 | 2.5 | 2.5 |
| Hexadecyldimothylamine | 0.3 | 0.3 | 0.3 | 0.3 | 0.3 | 0.3 | 0.3 | 0.3 | 0.40 | 0.40 |
| Silicone Surfactant | 1.0 | 1.0 | 1.0 | 1.0 | 1.0 | 1.0 | — | — | 1.0 | 1.0 |
| Organic Surfactant A | — | — | — | — | — | — | 1.6 | 1.6 | — | — |
| Organic Surfactant B | — | — | — | — | — | — | 1.0 | 1.0 | — | — |
| n-coco morpholine | — | 1.0 | — | 1.0 | — | — | 1.0 | — | — | — |
| Non-ionic Surfactant | 0.5 | 0.5 | 0.5 | 0.5 | — | — | — | — | — | — |
| Glycerol | — | — | 1.0 | 1.0 | — | — | — | — | — | — |
| Blend A | — | — | — | — | — | 1.0 | 0 | 1.0 | — | 1.0 |
| Flame Retardant A | 7.0 | 7.0 | 7.0 | 7.0 | — | — | 7.0 | 7.0 | — | — |
| TDI 80/20 | 51.1 | 51.1 | 52.2 | 52.2 | 49.0 | 50.7 | 49.0 | 50.7 | 51.0 | 54.9 |
| Index | 120 | 120 | 115 | 115 | 115 | 115 | 115 | 115 | 110 | 115 |
| Cream Time, seconds | 12 | 10 | 15 | 13 | 12 | 14 | 13 | 16 | 11 | 12 |
| Rise Time, seconds | 81 | 69 | 89 | 77 | 67 | 77 | 81 | 101 | 57 | 60 |
| Breathability, SCFM | 0.55 | 0.40 | 1.3 | 0.80 | 0.45 | 1.20 | 0.85 | 1.25 | 0.55 | 1.0 |
| Density, pcf | 1.89 | 2.08 | 1.79 | 1.82 | 1.76 | 1.60 | 1.95 | 1.81 | 1.68 | 1.50 |
| Diecuttability, Recovery % | | | | | | | | | | |
| after 15 seconds | — | — | 90 | — | — | — | 88 | 90 | — | 97 |
| 15 seconds | 30 | 30 | 93 | 80 | 4 | 87 | 89 | 98 | 0 | 98 |
| 30 seconds | 50 | 40 | 97 | 93 | 7 | 97 | 98 | 98 | 0 | 99 |
| 60 seconds | 80 | 45 | 98 | 98 | 12 | 98 | 98 | 99 | 3 | 100 |
| | | Control | | Control | | Control | | | | Control |

EXAMPLES 72–81

TABLE VIII

| Example | 72 | 73 | 74 | 75 | 76 | 77 | 78 | 79 | 80 | 81 |
|---|---|---|---|---|---|---|---|---|---|---|
| Resin A | 100 | 100 | 100 | 100 | 100 | 100 | 100 | 100 | 100 | 100 |
| Water | 3.6 | 3.6 | 3.6 | 3.6 | 3.6 | 3.6 | 3.6 | 3.6 | 4.0 | 4.2 |
| Catalyst | 2.0 | 2.0 | 2.0 | 2.0 | 2.0 | 2.0 | 2.0 | 2.0 | 2.0 | 2.0 |
| Hexadecyldimethylamine | 0.25 | 0.25 | 0.25 | 0.25 | 0.25 | 0.25 | 0.25 | 0.25 | 0.30 | 0.30 |
| Silicone Surfactant | 1.0 | 1.0 | 1.0 | 1.0 | 1.0 | 1.0 | 1.0 | — | 1.0 | 1.0 |
| Organic Surfactant D | — | — | — | — | — | — | — | 1.5 | — | — |
| Blend A (with Ionol added 500 ppm) | — | 0.50 | — | 1.0 | 1.5 | 2.5 | 2.0 | — | 1.5 | 1.5 |
| N-Coco-Morpholine | — | — | — | — | — | — | — | 1.0 | — | — |
| Flame Retardant E | — | — | 7.0 | 7.0 | 7.0 | 7.0 | 7.0 | 7.0 | 7.0 | 7.0 |
| TDI | 49.0 | 49.8 | 49.0 | 50.6 | 51.3 | 53.0 | 49.9 | 49.0 | 55.3 | 58.1 |
| Index | 115 | 115 | 115 | 115 | 115 | 115 | 110 | 115 | 115 | 115 |
| Density, pcf | 1.68 | 1.64 | 1.79 | 1.68 | 1.74 | 1.74 | 1.68 | 1.80 | 1.58 | 1.54 |
| Breathability, SFCM | 0.85 | 0.60 | 0.80 | 0.70 | 0.40 | 0.80 | 0.35 | 0.30 | 0.29 | 0.35 |
| Cells Per Inch | 35–40 | 35–40 | 35–40 | 30–35 | 30–35 | 25–30 | 45–50 | 30–35 | 30–35 | 35–40 |
| ILD, 25 | 55.0 | 48.7 | 53.2 | 62.9 | 65.8 | 53.4 | 49.9 | 57.0 | 56.5 | 61.5 |
| 65 | 98.9 | 87.7 | 97.8 | 130.0 | 149.5 | 96.0 | 109.2 | 112.5 | 113.8 | 147.5 |
| Compression Set, 75/90 | 12.6/ 16.6 | 17.3/ 21.5 | 17.5/ 36.7 | 46.2/ 81.8 | 60.2/ 70.8 | 15.4/ 22.3 | 36.7/. 29.7 | 9.83/ 11.3 | 29.2/ 41.4 | 73.0/ 72.1 |
| Tensile Strength | 23.0 | 27.9 | 23.7 | 23.0 | 21.6 | 19.7 | 22.5 | 24.3 | 21.4 | 22.9 |
| Elongation, % | 232 | 272 | 260 | 139 | 130 | 172 | 216 | 260 | 173 | 167 |
| Tear Strength | 2.9 | 3.3 | 3.35 | 1.69 | 1.75 | 2.21 | 2.57 | 3.40 | 1.93 | 2.44 |
| Diecuttability, Recovery % after 60 Seconds | | | | | | | | | | |
| ½ Inch Sample | 65–70 | 85–90 | 65–70 | IR[1] | IR | 100 | 99 | 98[2] | 100 | 100 |
| ¼ Inch Sample | — | — | — | IR | IR | 99 | 99 | 85–90 | 100 | 100 |
| ⅛ Inch Sample | — | — | — | IR | IR | 95 | 98 | 85–90[3] | 100 | 99–100 |

[1]Instaneous recovery ½ inch and ⅛ inch samples (Ex. 75 only) also achieved instaneous recovery in 30 seconds.
[2]95–98 in 30 seconds.
[3]45–50 in 30 seconds.

These Examples illustrate the enhancement of diecuttability characteristics on machine-made foams in contrast to other prior techniques.

The foams were prepared as follows. To a Hennecke UBT-63 high pressure continuous polyurethane foam machine, there was fed: (1) the polyester polyol stream; (2) an activator stream containing water, amine catalyst and foam stabilizing surfactant; (3) a polyisocyanate stream; (4) a low combustibility additive stream (when used) and (5) the additive stream. The mixer speed was about 5000 revolutions per minute, and the head pressure was about 15 pounds per square inch. The foams were allowed to set and cure. After 24 hours of aging at ambient temperature, the foams are cut and submitted for physical property measurements.

The foam formulations used and the results are set forth in Table VIII. As can be seen, the use of the present invention provides improved diecuttability characteristics, resulting in some formulations in instaneous recovery. The physical properties of the resulting foams were also acceptable.

Thus, as has been seen, the present invention provides polyester urethane foams having improved diecuttability characteristics, even when low combustibility additives are present. These improved results are achieved without any significant adverse effects on the resulting foam properties. The initial tensile strength of foams made in accordance with the present invention is lowered; but it appears that the tensile values, after aging, have decreased significantly less than when conventional foam formulations are used. The utilization of increasing amounts of the diecuttability enhancing additives of the present invention correspondingly diminishes this loss in tensile strength after aging to the extent that in some instances, the value is substantially the same as the initial value.

It should be appreciated that day-to-day variations often create adverse effects on diecuttability. While the present invention may not in every instance impart sufficient enhancement to completely compensate, the utilization of the present invention has been found to consistently provide improvement in comparison to foams not formulated in accordance with this invention. Further, while the present invention is directed to polyester-based urethane foams, the foam formulations, as may be appreciated, can include minor amounts of polyether polyols or the like as long as the resulting urethane foam retains the polyester characteristics required for the particular end use involved.

What is claimed is:

1. A process for producing a diecuttable polyester urethane foam, useful in the production of hair curlers, characterized by improved diecuttability characteristics which comprises simultaneously reacting and foaming a reaction mixture consisting essentially of: (a) a polyester polyol reactant containing an average of at least two hydroxyl groups per molecule; (b) a polyisocyanate reactant containing at least two isocyanate groups per molecule; (c) a blowing agent; (d) a catalyst for the reaction of (a) and (b); (e) a foam stabilizer and (f) as a diecuttability enhancing additive, a low molecular weight polyol selected from the groups consisting of (1) an aliphatic alcohol having the following structural formula:

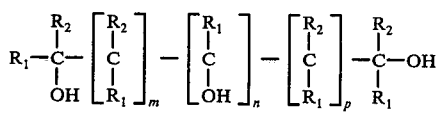

wherein $R_1$ is hydrogen, alkyl ($C_1 - C_8$), or cycloalkyl ($C_4 - C_8$); $R_2$ is hydrogen or alkyl ($C_1 - C_4$); $m$ and $p$ are zero or integers and the sum of $m$ and $p$ is 8 or less; and $n$ is an integer from 1 to about 4; (2) a low molecular weight polymethylol compound having the following structural formula:

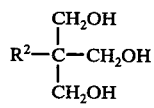

wherein $R^2$ is hydrogen, lower alkyl ($C_1$ to about $C_8$) or methylol ($CH_2OH$); (3) an alkanolamine having the following structural formula:

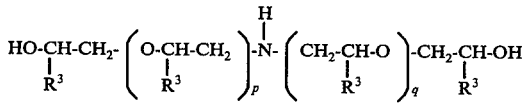

wherein $R^3$ is H or alkyl ($C_1$ to about $C_4$) and $p$ and $q$ are zero or integers from 1 to about 4; (4) alkylene oxide adducts having a functionality greater than 2 and a minimum hydroxyl number of about 100, and (5) mixtures thereof.

2. The process of claim 1 wherein the diecuttability enhancing additive is an aliphatic alcohol selected from the group consisting of glycerol; erythritol; sorbitol; 1, 2, 6 - hexanetriol; 1, 3, 5 - hexanetriol and 1, 2, 4 - butanetriol.

3. The process of claim 1 wherein the diecuttability enhancing additive is glycerol.

4. The process of claim 1 wherein the diecuttability enhancing additive is a polymethylol compound selected from the group consisting of trimethylolpropane, trimethylolethane and pentaerythritol.

5. The process of claim 4 wherein the polymethylol compound is trimethylolpropane.

6. The process of claim 1 wherein the diecuttability enhancing additive is an alkanolamine selected from the group consisting of diethanolamine, diisopropanolamine and ethanol isopropanol amine.

7. The process of claim 6 wherein the alkanolamine is diethanolamine.

8. The process of claim 1 wherein the diecuttability enhancing additive is an alkylene oxide adduct consisting of propylene oxide and a starter selected from the group consisting of glycerol, sucrose, diethylenetriamine and 1, 2, 6 - hexanetriol.

9. The process of claim 1 wherein the diecuttability enhancing additive is present in the range of from about 0.05 to about 10 parts per 100 parts of the polyester polyol reactant.

10. The process of claim 1 wherein the diecuttability enhancing additive is present in the range of about 0.1 to 6.0 parts per 100 parts of the polyester polyol reactant.

11. The process of claim 1 wherein the diecuttability enhancing additive is present in the range about 0.2 to 3.0 parts per 100 parts of the polyester polyol reactant.

12. The process of claim 1 wherein the polyisocyanate reaction is present in an amount sufficient to provide an isocyanate index of from about 100 to about 125.

13. The process of claim 1 wherein the foam stabilizer is a silicone surfactant.

14. The process of claim 36 which includes, cojointly with the diecuttability enhancing additive, a coadditive selected from the group consisting of (1) an alkylene oxide adduct with linear alcohols and phenols, the moles of alkylene oxide, per mole of the linear alcohols or phenols, being from about 3 to about 15, (2) sulfonated petroleum oils, (3) diethylammonium oleate, (4) cyanopropyl-substituted silicone-containing copolymers and (5) mixtures thereof, wherein the combined amount of additive and co-additive is from about 0.05 to about 10 parts per 100 parts by weight of the polyester polyol.

15. The process of claim 14 wherein the co-additive is an ethylene oxide-linear alcohol ($C_{11} - C_{15}$ mixture) adduct.

16. The process of claim 14 wherein the co-additive is a sodium petroleum sulfonate anionic surfactant having an average molecular weight of about 420 and a mineral content of about 33 weight percent.

17. The process of claim 14 wherein the co-additive is a cyanopropyl-substituted polymethylsiloxane hydride having the average composition:

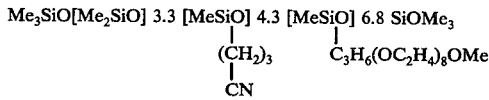

18. A polyester-based urethane foam, useful in the production of hair curlers, which comprises the product formed by simultaneously reacting and foaming a reaction mixture consisting essentially of: (a) a polyester polyol reactant containing an average of at least two hydroxyl groups per molecule; (b) a polyisocyanate reactant containing at least two isocyanate groups per molecule; (c) a blowing agent; (d) a catalyst for the reaction of (a) and (b); (e) a foam stabilizer and (f) as a diecuttability enhancing additive, a low molecular weight polyol selected from the groups consisting of (1

) an aliphatic alcohol having the following structural formula:

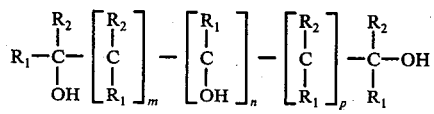

wherein $R_1$ is hydrogen, alkyl ($C_1 - C_8$), or cycloalkyl ($C_4 - C_8$); $R_2$ is hydrogen or alkyl ($C_1 - C_4$); $m$ and $p$ are zero or integers and the sum of $m$ and $p$ is 8 or less; and $n$ is an integer from 1 to about 4; (2) a low molecular weight polymethylol compound having the following structural formula:

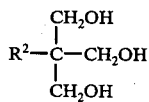

wherein $R^2$ is hydrogen, lower alkyl ($C_1$ to about $C_8$) or methylol ($CH_2OH$); (3) an alkanolamine having the following structural formula:

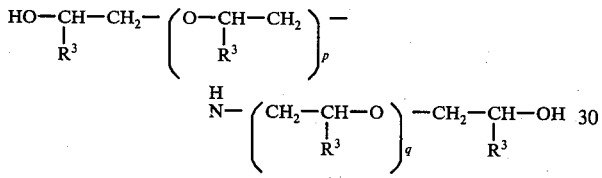

wherein $R^3$ is H or alkyl ($C_1$ to about $C_4$) and $p$ and $q$ are zero or may have integral values from 1 to about 4; (4) alkylene oxide adducts having a functionality greater than 2 and a minimum hydroxyl number of about 100, and (5) mixtures thereof.

19. The polyester-based urethane foam of claim 18 wherein the diecuttability enhancing additive is an aliphatic alcohol selected from the group consisting glycerol; erythritol; sorbitol; 1, 2, 6 -hexanetriol; 1, 3, 5 - hexanetriol and 1, 2, 4 - butanetriol.

20. The polyester-based urethane foam of claim 18 wherein the diecuttability enhancing additive is glycerol.

21. The polyester-based urethane foam of claim 18 wherein the diecuttability enhancing additive is a polymethylol compound selected from the group consisting of trimethylolpropane, trimethylolethane and pentaerythritol.

22. The polyester-based urethane foam of claim 18 wherein the polymethylol compound is trimethylolpropane.

23. The polyester-based urethane foam of claim 18 wherein the diecuttability enhancing additive is an alkanolamine selected from the group consisting of diethanolamine, diisopropanolamine and ethanol isopropanol amine.

24. The polyester-based urethane foam of claim 18 wherein the alkanolamine is diethanolamine.

25. The polyester-based urethane foam of claim 18 wherein the diecuttability enhancing additive is an alkylene oxide adduct consisting of propylene oxide and a starter selected from the group consisting of glycerol, sucrose, diethylenetriamine and 1, 2, 6 - hexanetriol.

26. The polyester-based urethane foam of claim 18 wherein the diecuttability enhancing additive is present in the range of about 0.05 to about 10 parts per 100 parts of the polyester polyol reactant.

27. The polyester-based urethane foam of claim 18 wherein the diecuttability enhancing additive is present in the range about 0.1 to 6.0 parts per 100 parts of the polyester polyol reactant.

28. The polyester-based urethane foam of claim 18 wherein the diecuttability enhancing additive is present in the range about 0.2 to 3.0 parts per 100 parts of the polyester polyol reactant.

29. The polyester-based urethane foam of claim 37 which includes, cojointly with the diecuttability enhancing additive, a co-additive selected from the group consisting of (1) alkylene oxide adduct with linear alcohols and phenols, the moles of alkylene oxide, per mole of the linear alcohols and phenols, being from about 3 to about 15, (2) sulfonated petroleum oils, (3) diethylammonium oleate, (4) cyanopropyl-substituted silicone-containing polymers and (5) mixtures thereof, wherein the amount of co-additive is from about 0 to about 9.95 parts per 100 parts by weight of the polyester polyol with the proviso that the combined amount of additive and co-additive be between about 0.15 and about 10 parts per 100 parts by weight of the polyester polyol.

30. The polyester-based urethane foam of claim 29 wherein the co-additive is an ethylene oxide-linear alcohol ($C_{11} - C_{15}$ mixture) adduct.

31. The polyester-based urethane foam of claim 29 wherein the co-additive is a sodium petroleum sulfonate anionic surfactant having an average molecular weight of about 420 and a mineral content of about 33 weight percent.

32. The polyester-based urethane foam of claim 29 wherein the co-additive is a cyanopropyl-substituted polymethylsiloxane hydride having the average composition:

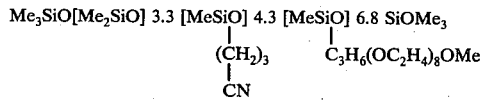

33. A process for producing a diecuttable polyester urethane foam characterized by improved diecuttability characteristics which comprises simultaneously reacting and foaming a reaction mixture containing: (a) a polyester polyol reactant containing an average of at least two hydroxyl groups per molecule; (b) a polyisocyanate reactant containing at least two isocyanate groups per molecule; (c) a blowing agent; (d) a catalyst for the reaction of (a) and (b); (e) a foam stabilizer and (f) as a diecuttability enhancing additive, a low molecular weight polyol selected from the groups consisting of (1) an aliphatic alcohol having the following structural formula:

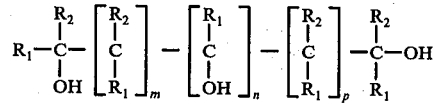

wherein $R_1$ is hydrogen, alkyl ($C_1 - C_8$), or cycloalkyl ($C_4 - C_8$); $R_2$ is hydrogen or alkyl ($C_1 - C_4$); $m$ and $p$ are integers and the sum of $m$ and $p$ is 8 or less; and $n$ is an integer from 1 to about 4; (2) a low molecular weight polymethylol compound having the following structural formula:

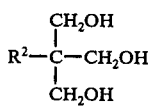

wherein $R^2$ is hydrogen, lower alkyl ($C_1$ to about $C_8$) or methylol ($CH_2OH$); (3) an alkanolamine having the following structural formula:

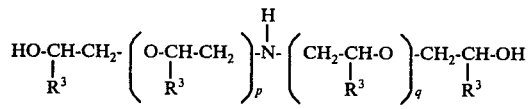

wherein $R^3$ is H or alkyl ($C_1$ to about $C_4$) and $p$ and $q$ are zero or integers from 1 to about 4; (4) alkylene oxide adducts having a functionality greater than 2 and a minimum hydroxyl number of about 100, and (5) mixtures thereof.

34. A polyester-based urethane foam which comprises the product formed by simultaneously reacting and foaming a reaction mixture containing: (a) a polyester polyol reactant containing an average of at least two hydroxyl groups per molecule; (b) a polyisocyanate reactant containing at least two isocyanate groups per molecule; (c) a blowing agent; (d) a catalyst for the reaction of (a) and (b); (e) a foam stabilizer and (f) as a diecuttability enhancing additive, a low molecular weight polyol selected from the groups consisting of (1) an aliphatic alcohol having the following structural formula:

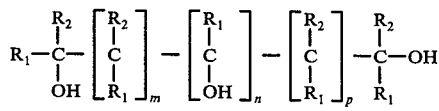

wherein $R_1$ is hydrogen, alkyl ($C_1$ - $C_8$), or cycloalkyl ($C_4$ - $C_8$); $R_2$ is hydrogen or alkyl ($C_1$ - $C_4$); $m$ and $p$ are integers and the sum of $m$ and $p$ is 8 or less; and $n$ is an integer from 1 to about 4; (a) a low molecular weight polymethylol compound having the following structural formula:

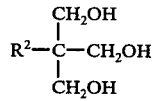

wherein $R^2$ is hydrogen, lower alkyl ($C_1$ to about $C_8$) or methylol ($CH_2OH$); (3) an alkanolamine having the following structural formula:

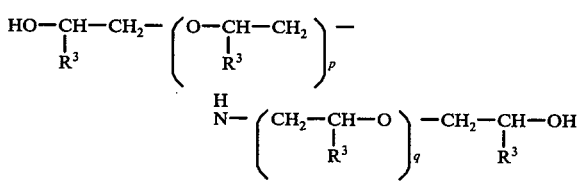

wherein $R^3$ is H or alkyl ($C_1$ to about $C_4$) and $p$ and $q$ are zero or may have integral values from 1 to about 4; (4) alkylene oxide adducts having a functionality greater than 2 and a minimum hydroxyl number of about 100, and (5) mixtures thereof.

35. A polyester-based urethane foam as claimed in claim 18 having from 25 to 50 cells per linear inch.

36. A polyester-based urethane foam as claimed in claim 18 having a density from 1.65 to 1.96 pounds per cubic foot.

37. A polyester-based urethane foam as claimed in claim 18 having a density from 1.65 to 1.96 pounds per cubic foot and having from 25 to 50 cells per linear inch.

38. A process for producing a diecuttable polyester urethane foam, useful in the production of hair curlers, characterized by improved diecuttability characteristics which comprises simultaneously reacting and foaming a reaction mixture consisting essentially of: (a) a polyester polyol reactant containing an average of at least two hydroxyl groups per molecule; (b) a polyisocyanate reactant containing an average of at least two isocyanate groups per molecule in an amount sufficient to produce an Isocyanate Index of from about 100 to about 125; (c) a blowing agent; (d) a catalyst for the reaction of (a) and (b); (e) a foam stabilizer; (f) as a diecuttability enhancing additive, a low molecular weight polyol selected from the groups consisting of (1) an aliphatic alcohol having the following structural formula:

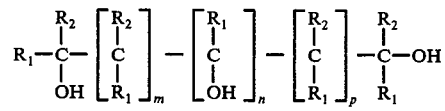

wherein $R_1$ is hydrogen, alkyl ($C_1$ - $C_8$), or cycloalkyl ($C_4$ - $C_8$); $R_2$ is hydrogen or alkyl ($C_1$ - $C_4$); $m$ and $p$ are zero or integers and the sum of $m$ and $p$ is 8 or less; and $n$ is an integer from 1 to about 4; (2) a low molecular weight polymethylol compound having the following structural formula:

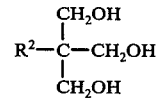

wherein $R^2$ is hydrogen, lower alkyl ($C_1$ to about $C_8$) or methylol ($CH_2OH$); (3) an alkanolamine having the following structural formula:

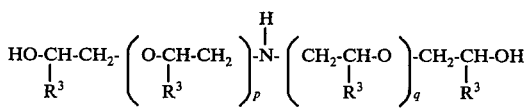

wherein $R^3$ is H or alkyl ($C_1$ to about $C_4$) and $p$ and $q$ are zero or integers from 1 to about 4; (4) alkylene oxide adducts having a functionality greater than 2 and a minimum hydroxyl number of about 100, and (5) mixtures thereof, in an amount of from about 0.2 to about 3.0 parts per 100 parts by weight of the polyester polyol; and (g) a co-additive selected from the group consisting of (1) an alkylene oxide adduct with linear alcohols and phenols, the moles of alkylene oxide, per mole of the linear alcohols or phenols, being from about 3 to about 15, (2) sulfonated petroleum oils, (3) diethylammonium oleate, (4) cyanopropyl-substituted silicone-containing copolymers and (5) mixtures thereof, wherein the combined amount of additive and co-additive is from about 0.2 to about 10 parts per 100 parts by weight of the polyester polyol.

39. A diecuttable polyester urethane foam produced by the process of claim 38.

* * * * *

UNITED STATES PATENT OFFICE
CERTIFICATE OF CORRECTION

Patent No. 4,088,615                    Dated May 9, 1978

Inventor(s) Michael Ray Sandner, et al.

It is certified that error appears in the above-identified patent and that said Letters Patent are hereby corrected as shown below:

In column 1, line 43, "now" should read ---not---. In column 4, line 58, "petroluem" should read ---petroleum---. In column 10, line 13, "annd" should read ---and---. In column 13, lines 50 and 55, "Kannen" should read ---Kanner---. In column 14, line 1, "acids" should read ---acid---. In column 15, line 27, "bias" should read ---bis---. In Table I, Example 11, for Organic Surfactant C, "1.0" should read ---2.0---. In Table II, the first six values should appear in Example 12 and the arrow should extend through to Example 26. In Table III, the first six and the eleventh through thirteenth values should appear in Example 27 and the arrows should extend through to Example 34. In Table VI, Example 61, for Diecuttability, Recovery % after 15 seconds, "83" should read ---88---. In Table VII, the designation "Control" should appear in Examples 62, 64, 66, and 70.

UNITED STATES PATENT OFFICE
CERTIFICATE OF CORRECTION

Patent No. 4,088,615          Dated May 9, 1978

Inventor(s) Michael Ray Sandner, et al.

It is certified that error appears in the above-identified patent and that said Letters Patent are hereby corrected as shown below:

In Table VIII, Example 80, for TDI, "55.3" should read ---55.8---, and, for Compression Set, "29.2" should read ---28.2---. In column 30, line 19, "polymers" should read ---copolymers---. In column 30, line 23, "0.15" should read ---0.05---.

Signed and Sealed this

Seventh Day of November 1978

[SEAL]

*Attest:*

RUTH C. MASON
*Attesting Officer*

DONALD W. BANNER
*Commissioner of Patents and Trademarks*